United States Patent Office.

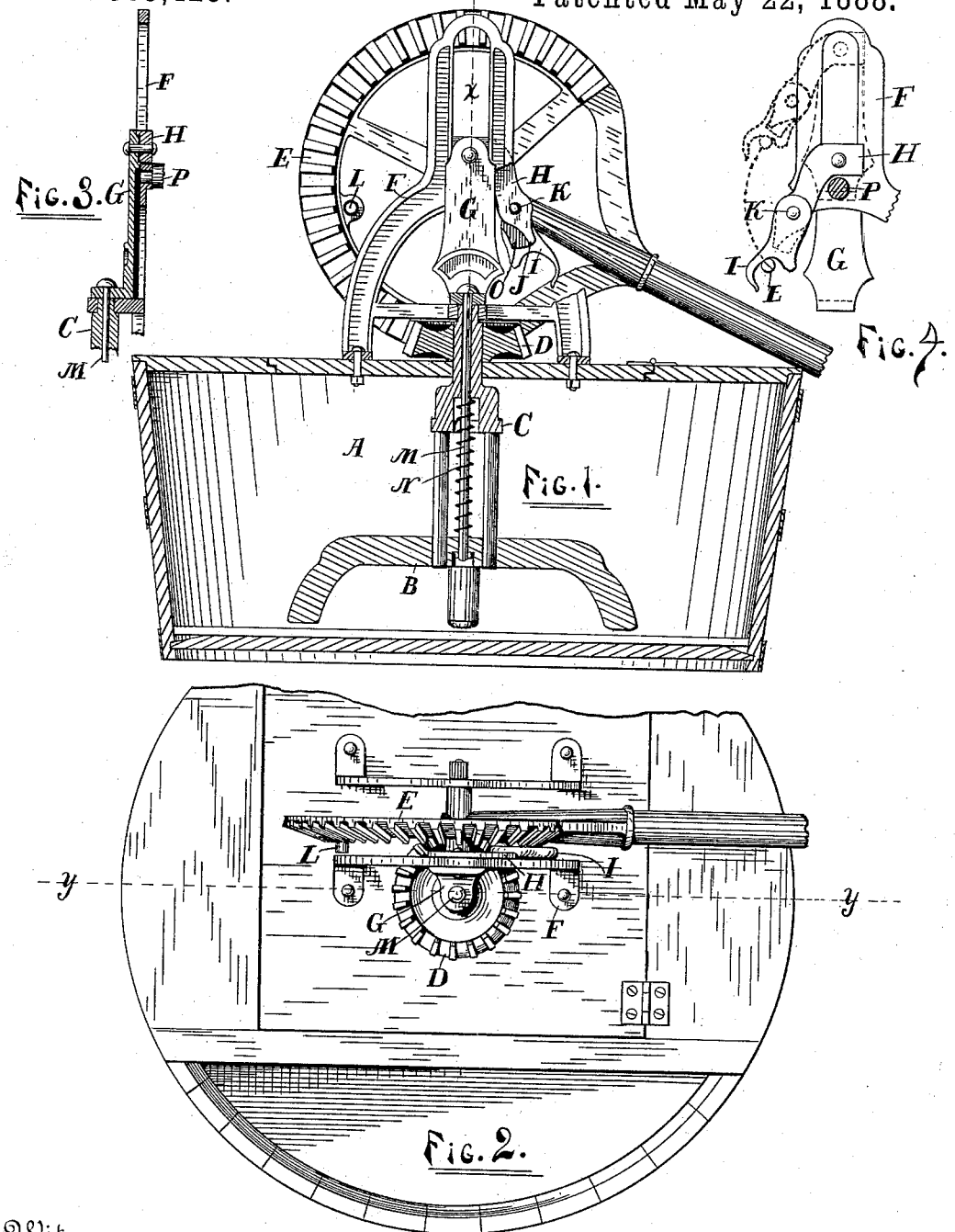

OSCAR F. GLIDDEN, OF GRAND RAPIDS, MICHIGAN, ASSIGNOR, BY MESNE ASSIGNMENTS, TO THE MICHIGAN WASHING MACHINE COMPANY, OF SAME PLACE.

WASHING-MACHINE.

SPECIFICATION forming part of Letters Patent No. 383,425, dated May 22, 1888.

Application filed May 23, 1887. Serial No. 239,131. (No model.)

*To all whom it may concern:*

Be it known that I, OSCAR F. GLIDDEN, a citizen of the United States, residing at the city of Grand Rapids, in the county of Kent and State of Michigan, have invented certain new and useful Improvements in Washing-Machines, of which the following is a specification.

My invention relates to that class of washing-machines provided with a stirring device having a rotary motion and operated by suitable mechanism, in connection with a tub or vessel to which the mechanism is applied; and the object of my invention is to provide suitable mechanism for raising or lowering automatically the stirring device, as more fully described below. This object I accomplish by means of the mechanism illustrated in the accompanying drawings, in which—

Figure 1 is a sectional view of a washing-machine constructed in accordance with my invention, on line $y\,y$ of Fig. 2. Fig. 2 is a plan view of my invention. Fig. 3 is a sectional view of the same on line $x\,x$ of Fig. 1, and Fig. 4 is a reverse side elevation of the device used in raising and depressing the stirring device.

Similar letters refer to similar parts throughout the several views.

A represents the tub or vessel to which the machine is applied.

B represents the stirring device, which is intended to reach near the bottom of the tub, and may, if desired, be constructed so as to rest upon the tub's bottom.

C is a hollow shaft rigidly attached at the top to the pinion D, and has extending downward therefrom supports for the stirrer B, said supports passing through the openings in the stirrer, so as to allow said stirrer B to be raised and lowered, sliding upon the supports.

E is a cog-wheel, which engages with and operates the pinion D. The cog-wheel E is provided with a handle or lever for the purpose of imparting rotary reciprocating motion.

F is a frame-work which supports the cog-wheel E, with its lever, and also forms both a support and a guide for the plate G.

M is a rod connected at the bottom with the stirrer B, and passes upward through the hollow shaft C, and also through the lower bent part of the plate G, and is provided with a head, as shown in Figs. 1 and 3. The plate G, connected with the rod M, as described, is designed to have a vertical motion, for the purpose of raising and lowering the stirrer B.

H is an arm rigidly attached to the plate G, as shown in Fig. 4.

I is an arm pivoted to the arm H by the bolt or rivet K, so that it has a turning motion upon the said bolt.

O is a cavity or depression in the arm I. Within this cavity is the lower end of the arm H, as shown by J. This point J being small, the arm I may swing so as to bring J against either side of the depression or cavity O.

L is a pin or stud attached to the cog-wheel E at such a point that the turning of the cog-wheel E by the lever brings the stud L in contact with the lower curved portion of the swinging arm I.

In Fig. 4, L shows the position of the stud when in contact with I. When the stud L, by the turning of the wheel E, reaches the arm I, this arm is carried with it until checked by the point J, when the arm H, together with the plate G, rod M, and stirrer B, is raised to the position shown by the dotted lines in Fig. 4. The pivoting of arm I upon arm H by the pivot K allows the extremity of the arm I, which engages with stud L, to follow the arc described by the stud L in its upward motion, and is made necessary by the rigid attachment of arm H to plate G. This operation lifts the stirrer B from the clothes, and when it comes down it presses upon them in a place different from the one at which it left them before being raised. By means of this construction I am enabled more fully to remove the dirt from the clothes and to grasp them between the stirrer and the bottom of the tub in different places.

N represents a coiled spring surrounding the rod M and adapted to press the stirrer downward, in order to hold it in contact with the clothes to be operated upon.

P represents the main shaft of the wheel E. I have found by experiment that this construction of the swinging arm I, rigid arm H, and plate G, and the connecting parts, allows for the automatic raising and lowering of the stirrer B and the parts thereto attached without friction, and is very effective for the purpose for which such parts are designed.

In constructing a tub or vessel for my mechanism it is desirable to leave a place at one side for the attachment of the clothes-wringer, as shown in Fig. 2; and it is further desirable to hinge a portion of the lid, as also shown in Fig. 2, so that the tub or vessel may be readily opened for inspection and for the removal and replacement of the clothes within the tub or vessel.

I am aware that I am not the first inventor of a device for lifting the stirrer or rub-block from the clothes, and I do not claim the same, broadly; but I do not know of any such device which employs mechanism similar to that above described.

Having thus described my invention, what I claim to have invented, and desire to secure by Letters Patent, is—

1. In a washing-machine of the class described, a revoluble and vertically-adjustable stirrer or rub-block, in combination with a vertically-placed segmental gear engaging with the pinion on the shaft of the stirrer, a pin or stud upon such segmental gear, and a plate attached to the stirrer, said plate having attached thereto the jointed arm H I, with which arm the stud or pin engages and thereby raises the stirrer, substantially as and for the purpose described.

2. In a washing-machine of the class named, the combination of the tub or vessel A, the stirrer B, vertically adjustable, the hollow shaft C, spring N, pinion D, segmental gear E, provided with the pin L, plate G, the arm H, the hooked arm I, and the rod M, and the standard F, substantially as described.

OSCAR F. GLIDDEN.

Witnesses:
ARTHUR C. DENISON,
EMILY A. PELTON.